US011065760B2

(12) United States Patent
Ho et al.

(10) Patent No.: US 11,065,760 B2
(45) Date of Patent: Jul. 20, 2021

(54) MULTIAXIAL ROBOT WITH COVER

(71) Applicants: Inventec Appliances (Pudong) Corporation, Shanghai (CN); Inventec Appliances Corp., New Taipei (TW)

(72) Inventors: Dai-Shui Ho, New Taipei (TW); Chia-Hang Ho, Shanghai (CN)

(73) Assignees: Inventec Appliances (Pudong) Corporation, Shanghai (CN); Inventec Appliances Corp., New Taipei (TW)

( * ) Notice: Subject to any disclaimer, the term of this patent is extended or adjusted under 35 U.S.C. 154(b) by 0 days.

(21) Appl. No.: 16/546,287

(22) Filed: Aug. 20, 2019

(65) Prior Publication Data

US 2019/0375097 A1 Dec. 12, 2019

Related U.S. Application Data

(63) Continuation-in-part of application No. 15/252,230, filed on Aug. 31, 2016, now abandoned.

(30) Foreign Application Priority Data

Aug. 9, 2016 (CN) .......................... 201610647434.X

(51) Int. Cl.
*B25J 9/04* (2006.01)
*B25J 17/02* (2006.01)
*B25J 18/04* (2006.01)
*B25J 9/00* (2006.01)

(52) U.S. Cl.
CPC .............. *B25J 9/043* (2013.01); *B25J 9/009* (2013.01); *B25J 17/0258* (2013.01); *B25J 18/04* (2013.01)

(58) Field of Classification Search
None
See application file for complete search history.

(56) References Cited

U.S. PATENT DOCUMENTS

| 4,536,690 | A |   | 8/1985  | Belsterling et al. |
| 5,184,601 | A | * | 2/1993  | Putman .................... B25J 9/042 |
|           |   |   |         | 312/209 |
| 5,351,676 | A |   | 10/1994 | Putman |
| 5,570,992 | A | * | 11/1996 | Lemelson .............. B25J 9/1015 |
|           |   |   |         | 414/744.3 |
| 8,655,429 | B2|   | 2/2014  | Kuduvalli et al. |
| 2005/0040812 | A1 |   | 2/2005 | Halt et al. |

(Continued)

FOREIGN PATENT DOCUMENTS

| CN | 102896641 A | 1/2013 |
| CN | 103328161 A | 9/2013 |

(Continued)

*Primary Examiner* — Gerald McClain
(74) *Attorney, Agent, or Firm* — CKC & Partners Co., LLC

(57) ABSTRACT

A multiaxial robot includes a first rotation module, a second rotation module, and a connecting member. The first rotation module includes a base and a plurality of arms. The arms are configured to rotate parallel to a first plane relative to the base. The second rotation module includes at least one wrist. The wrist is connected to the farthest arm arranged from the base in the first rotation module and configured to rotate parallel to a second plane relative to the first rotation module. The connecting member is pivotally connected to the base and connected to an adjacent one of the arms, or is connected between adjacent two of the arms and the wrist.

5 Claims, 13 Drawing Sheets

(56) References Cited

U.S. PATENT DOCUMENTS

| | | |
|---|---|---|
| 2009/0024142 A1 | 1/2009 | Ruiz Morales |
| 2012/0134769 A1* | 5/2012 | Friedman ............ G01N 35/0099 |
| | | 414/751.1 |
| 2018/0009111 A1 | 1/2018 | Ho et al. |
| 2018/0086489 A1* | 3/2018 | Rogers .................... B25J 9/042 |

FOREIGN PATENT DOCUMENTS

| | | |
|---|---|---|
| CN | 103503127 A | 1/2014 |
| CN | 203542604 U | 4/2014 |
| CN | 203696220 U | 7/2014 |
| CN | 203792327 U | 8/2014 |
| CN | 104875178 A | 9/2015 |
| CN | 204772529 U | 11/2015 |
| CN | 105619400 A | 6/2016 |
| TW | 201622910 A | 7/2016 |

\* cited by examiner

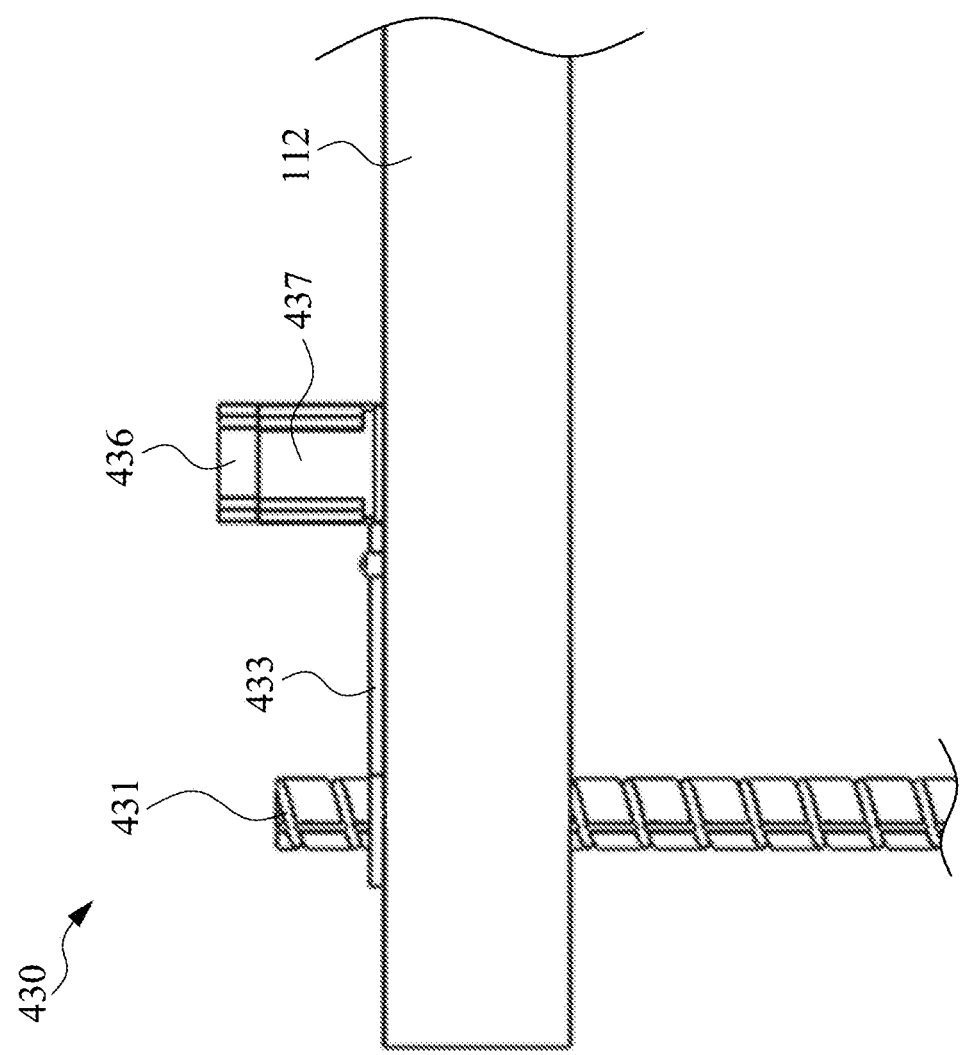

MULTIAXIAL ROBOT WITH COVER

RELATED APPLICATIONS

This application is a Continuation-in-part of U.S. application Ser. No. 15/252,230, filed on Aug. 31, 2016, which claims priority to China Application Number 201610647434.X, filed Aug. 9, 2016, the entirety of which is incorporated by reference herein.

BACKGROUND

Technical Field

The present disclosure relates to a multiaxial robot.

Description of Related Art

Compared with industries (e.g., the automobile industry) using mechanical arms, products of 3C industries (Computer, Communication and Consumer Electronic) have short life cycles and high deprecation rates. For this reason, the demands of the 3C industries for robots are getting higher and higher. Currently, SCARA (Selective Compliance Assembly Robot Arm) is a robot widely used in the 3C industries, which is designed for planar tasks. Specifically, the SCARA uses two rotary joints to achieve rapid positioning in the X-Y plane, and additionally use a movement joint and a rotary joint to respectively move along and rotate about the Z-direction. The structural configuration makes the SCARA be good at grabbing an object from a location and then rapidly place the object at another location. Therefore, the SCARA has been widely used in automated assembly lines.

Although the SCARA has advantages of High-speed, having first and second rotary joints with strong rigidity of, low price, large effective operating range, having optimization for the X-Y plane, simple reverse movement, and etc, but also has disadvantages of only being able to work horizontally and having short stroke in Z-direction. Hence, current automated workstations using the SCARA in the 3C industries are still subject to many restrictions.

In addition, to perform three-dimensional actions, using a conventional six-axis mechanical arm can also be considered. The six-axis mechanical arm has advantages of having long arm length, moving with flexible angles, having optimization for 3D continuous path, and etc, so the six-axis mechanical arm can be used for almost all applications. However, the six-axis mechanical arm has disadvantages of slow, high price, having restrictions to spherical working range, difficult reverse movement, having singularities, and etc. Moreover, the six-axis mechanical arm specializes in large amount of applications of curved surfaces, such as grinding, polishing, and etc., and the flexibility exceeds the demands of the 3C industries. Regarding to certain 3C industries only having demands for less three-dimensional actions, the use of the six-axis mechanical arm is overkill.

Accordingly, how to provide a multiaxial robot to solve the aforementioned problems becomes an important issue to be solved by those in the industry.

SUMMARY

An aspect of the disclosure is to provide a multiaxial robot not only can be quickly and easily applied to production activities but also can perform with actions with flexible angles in various tasks.

According to an embodiment of the disclosure, the multiaxial robot includes a first rotation module, a second rotation module, and a connecting member. The first rotation module includes a base and a plurality of arms. The arms are configured to rotate parallel to a first plane relative to the base. The second rotation module includes at least one wrist. The wrist is connected to the farthest arm arranged from the base in the first rotation module and configured to rotate parallel to a second plane relative to the first rotation module. The connecting member is connected between adjacent two of the arms and the wrist.

In an embodiment of the disclosure, the connecting member is an elevator member and configured to elevate components of the multiaxial robot arranged after the elevator member relative to the base in an elevating direction.

In an embodiment of the disclosure, the arms include a first arm, a second arm, and a third arm. An end of the first arm is pivotally connected to the base. Another end of the first arm is slidably connected to the elevator member. An end of the second arm is pivotally connected to the elevator member. An end of the third arm is pivotally connected to another end of the second arm. The wrist is pivotally connected to another end of the third arm.

In an embodiment of the disclosure, the arms include a first arm, a second arm, and a third arm. An end of the first arm is pivotally connected to the base. Another end of the first arm is slidably and pivotally connected to the elevator member. An end of the second arm is connected to the elevator member. An end of the third arm is pivotally connected to another end of the second arm. The wrist is pivotally connected to another end of the third arm.

In an embodiment of the disclosure, the arms include a first arm, a second arm, and a third arm. An end of the first arm being pivotally connected to the base. An end of the second arm is pivotally connected to another end of the first arm. Another end of the second arm is slidably connected to the elevator member. An end of the third arm is pivotally connected to the elevator member. The wrist is pivotally connected to another end of the third arm.

In an embodiment of the disclosure, the arms include a first arm, a second arm, and a third arm. An end of the first arm is pivotally connected to the base. An end of the second arm is pivotally connected to another end of the first arm. Another end of the second arm is slidably and pivotally connected to the elevator member. An end of the third arm is connected to the elevator member. The wrist is pivotally connected to another end of the third arm.

In an embodiment of the disclosure, the arms include a first arm, a second arm, and a third arm. An end of the first arm is pivotally connected to the base. An end of the second arm is pivotally connected to another end of the first arm. An end of the third arm is pivotally connected to another end of the second arm. Another end of the third arm is slidably connected to the elevator member. The wrist is pivotally connected to the elevator member.

In an embodiment of the disclosure, the second plane is substantially perpendicular to the first plane.

In an embodiment of the disclosure, the elevating direction is substantially perpendicular to the first plane.

In an embodiment of the disclosure, second rotation module includes a first wrist and a second wrist. The first wrist is connected to the farthest arm arranged from the base in the first rotation module and configured to rotate parallel to the second plane relative to the first rotation module. The second wrist is pivotally connected to the first wrist and configured to rotate parallel to a third plane relative to the first wrist.

According to an embodiment of the disclosure, the multiaxial robot includes a first rotation module, a second rotation module, and a connecting member. The first rotation module includes a base and a plurality of arms. The arms are configured to rotate parallel to a first plane relative to the base. The second rotation module includes at least one wrist. The wrist is connected to the farthest arm arranged from the base in the first rotation module and configured to rotate parallel to a second plane relative to the first rotation module. The connecting member is pivotally connected to the base and connected to an adjacent one of the arms.

In an embodiment of the disclosure, the connecting member is an elevator member and configured to elevate components of the multiaxial robot arranged after the elevator member relative to the base in an elevating direction.

In an embodiment of the disclosure, the elevator member is pivotally connected to the base, and the arms include a first arm, a second arm, and a third arm. An end of the first arm is slidably connected to the elevator member. An end of the second arm is pivotally connected to another end of the first arm. An end of the third arm is pivotally connected to another end of the second arm. The wrist is pivotally connected to another end of the third arm.

Accordingly, the multiaxial robot of the disclosure modifies the structural configuration of the SCARA. Specifically, the structural configuration of the multiaxial robot of the disclosure not only retains the flat and fast operating characteristics of the SCARA, but also adds the capability of performing actions with flexible angles (up to five or six degrees of freedom) of the six-axis mechanical arm. It can be seen that the multiaxial robot of the disclosure can optimize the operation mode of "rapidly and horizontally moving to a location and then performing horizontal or three-dimensional actions", which is different from the operation mode for "3D continuous path" of the six-axis mechanical arm, so the multiaxial robot does not have the disadvantages of difficult reverse movement, having singularities, and etc. Moreover, the multiaxial robot of the disclosure can be designed to be higher to achieve a high-cylinder range, which is better than the optimization of the conventional six-axis mechanical arm for multi-layer test stations and can effectively reduce the footprint of the multiaxial robot.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 5C is a partial side view of the multiaxial robot in FIG. 5A according to some embodiments of the disclosure;

DETAILED DESCRIPTION

Figure 1A:
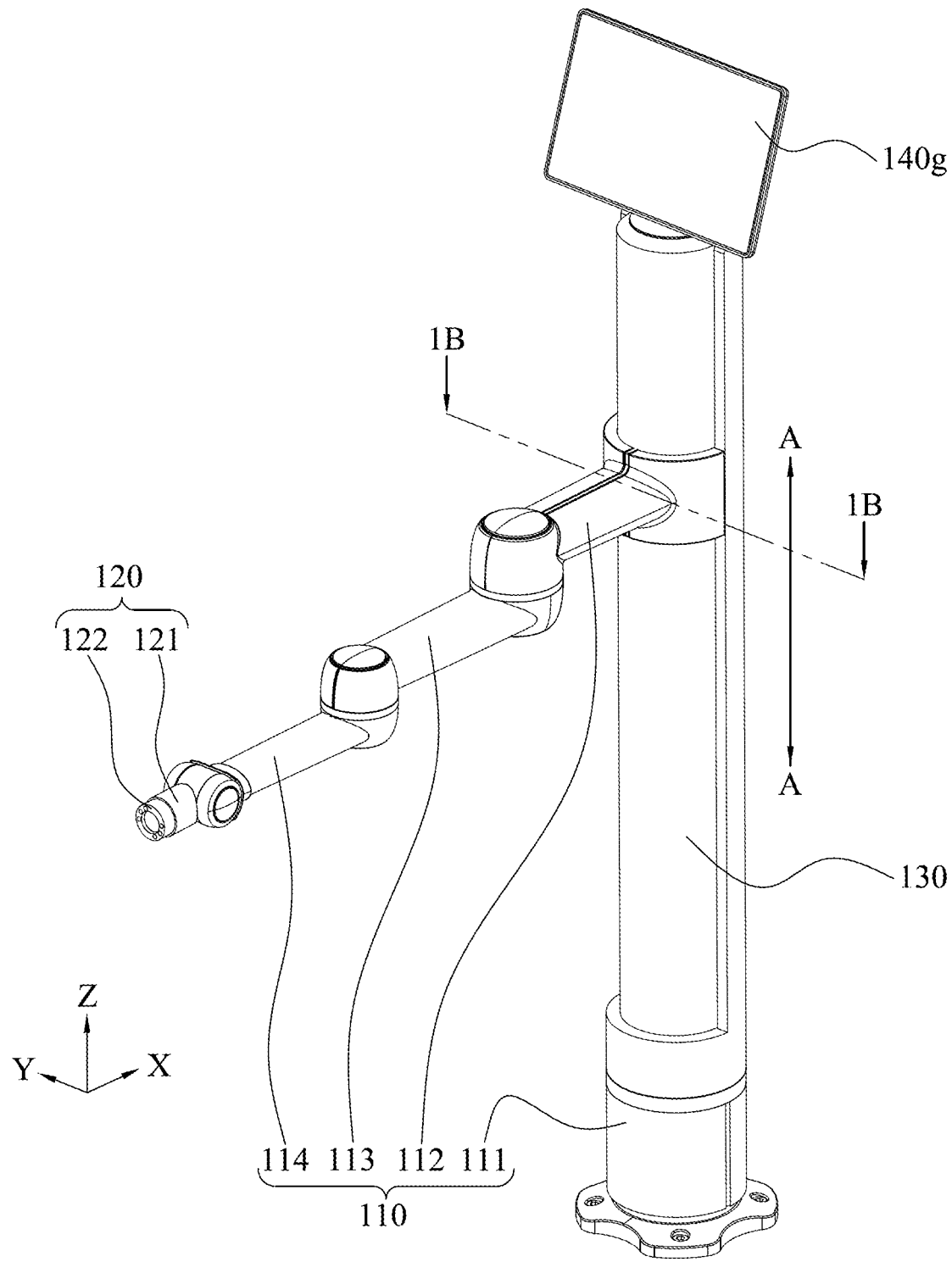
FIG. 1A is a perspective view of a multiaxial robot according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Figure 1B:
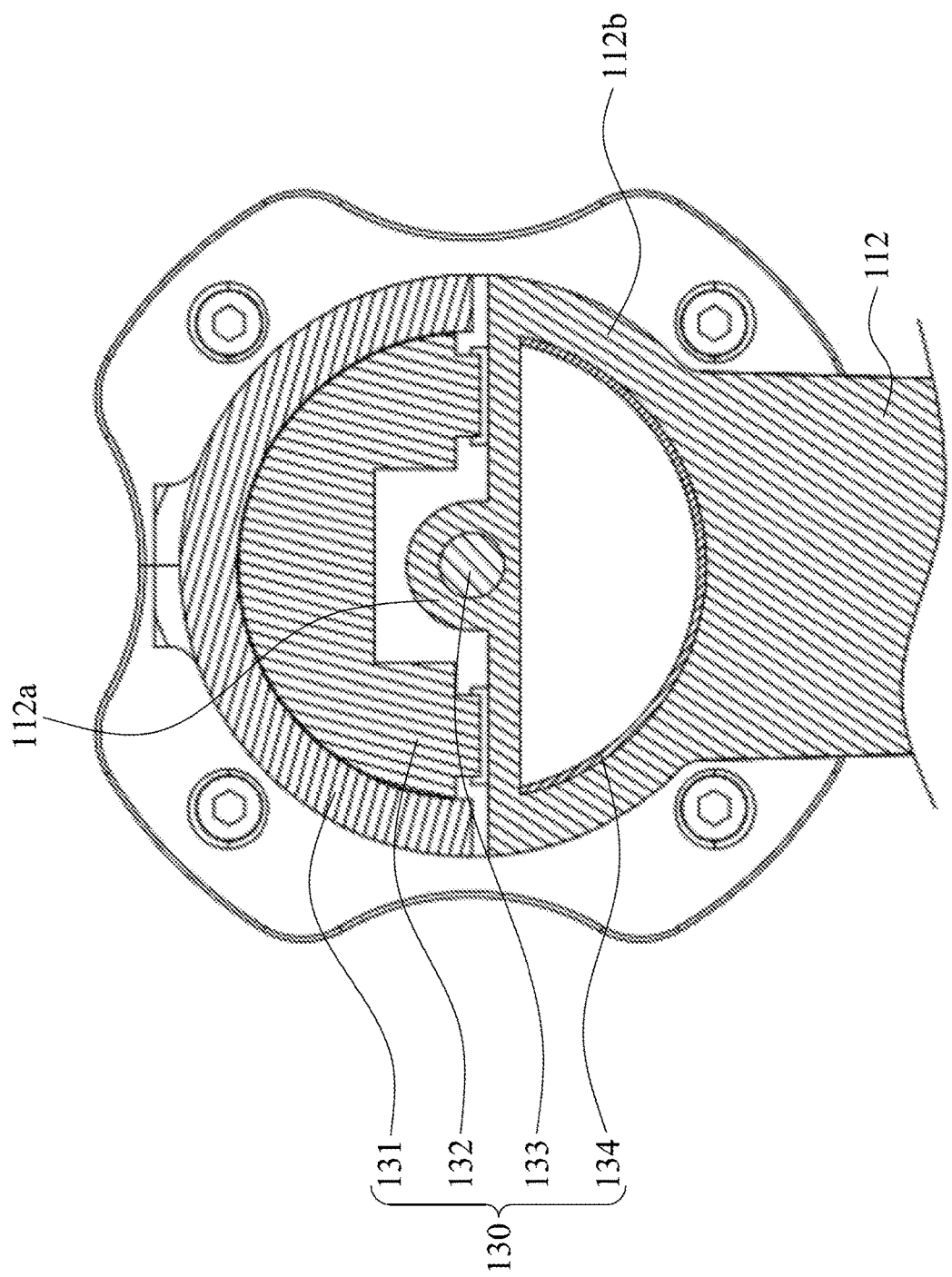
FIG. 1B is a partial cross-sectional view of the multiaxial robot in FIG. 1A taken along line 1B-1B according to some embodiments of the disclosure.
Figure 2:
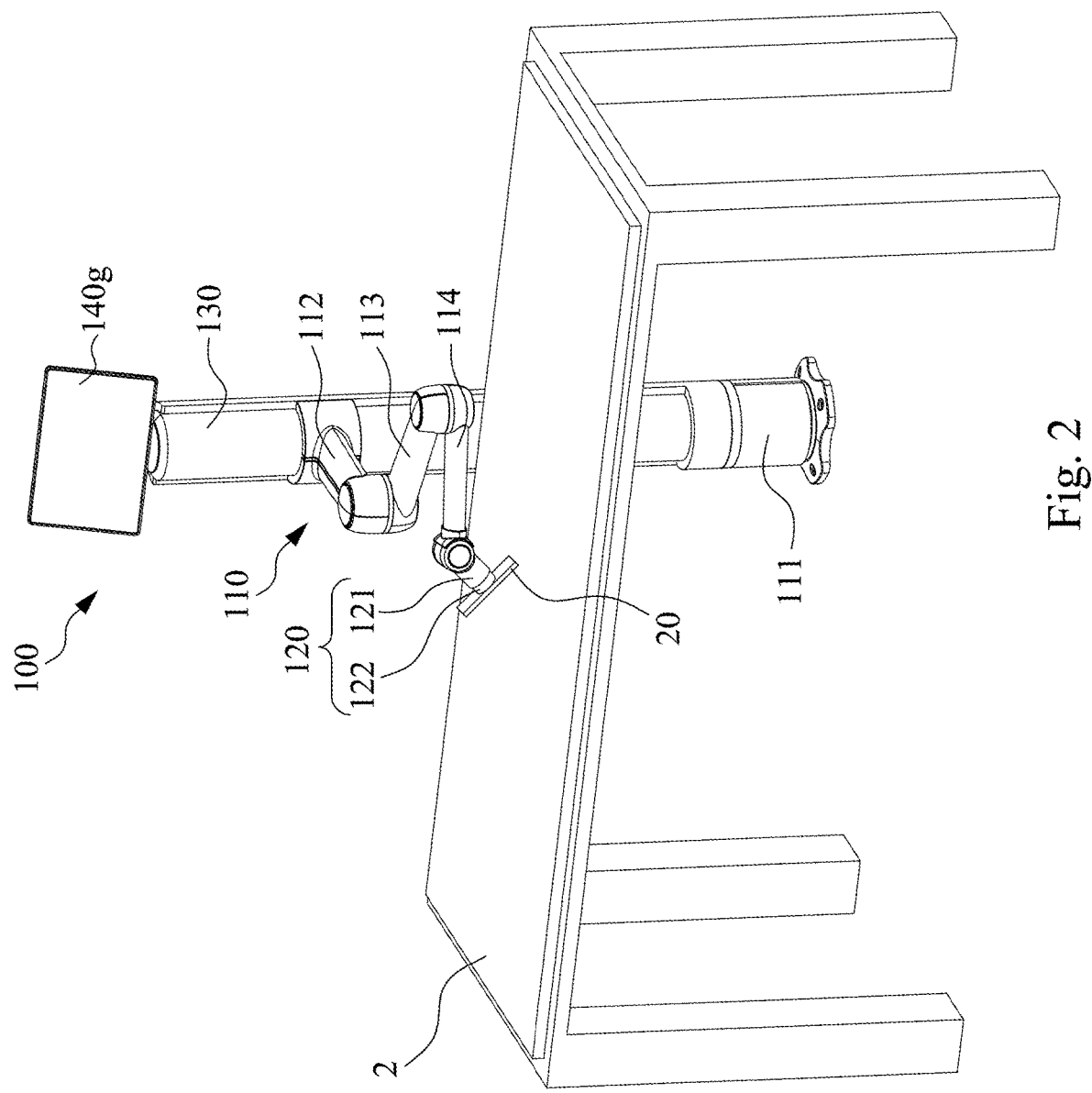
FIG. 2 is a side view of the multiaxial robot in FIG. 1A, in which the multiaxial robot is placing a workpiece on a table.

Reference is made to FIG. 1A, FIG. 1B, and FIG. 2. FIG. 1A is a perspective view of a multiaxial robot 100 according to an embodiment of the disclosure. FIG. 1B is a partial cross-sectional view of the multiaxial robot 100 in FIG. 1A taken along line 1B-1B according to some embodiments of the disclosure. FIG. 2 is a side view of the multiaxial robot 100 in FIG. 1A, in which the multiaxial robot 100 is placing a workpiece 20 on a table 2. As shown in FIG. 1A and FIG. 2, in the embodiment, the multiaxial robot 100 includes a first rotation module 110, a second rotation module 120, and a connecting member. In the present embodiment, the connecting member is an elevator member 130 (referring to FIG. 1B). The first rotation module 110 includes a base 111 and a plurality of arms (i.e., a first arm 112, a second arm 113, and a third arm 114 shown in FIG. 1A). The arms are configured to rotate parallel to a first plane (e.g., the X-Y plane formed by the X-axis and the Y-axis shown in FIG. 1A) relative to the base 11. The second rotation module 120 includes a first wrist 121. The first wrist 121 is connected to the farthest arm (i.e., the third arm 114) arranged from the base 111 in the first rotation module 110 and configured to rotate parallel to a second plane (e.g., the X-Z plane formed by the X-axis and the Z-axis shown in FIG. 1A) relative to the first rotation module 110. The elevator member 130 is pivotally connected to the base 111 and connected to an adjacent one of the arms (i.e., the first arm 112). The elevator member 130 is configured to elevate components of the multiaxial robot 100 arranged after the elevator member 130 relative to the base 111 in an elevating direction A (e.g., the direction parallel to the Z-axis). Specifically, in the embodiment, an end of the first arm 112 is slidably connected to the elevator member 130. An end of the second arm 113 is pivotally connected to another end of the first arm 112. An end of the third arm 114 is pivotally connected to another end of the second arm 113. The first wrist 121 is pivotally connected to another end of the third arm 114. Furthermore, the second rotation module 120 further includes a second wrist 122. The second wrist 122 is pivotally connected to the first wrist 121 and configured to rotate parallel to a third plane (e.g., the Y-Z plane formed by the Y-axis and the Z-axis shown in FIG. 1A) relative to the first wrist 121. In some embodiments, as shown in FIG. 2, an end of the second wrist 122 distal to the first wrist 121 is configured to grab and place the workpiece 20, but the disclosure is not limited in this regard.

With the foregoing structural configuration, the multiaxial robot 100 of the embodiment can provide flat and fast operating characteristics by the first rotation module 110 and perform actions with flexible angles (up to six degrees of freedom) by the second rotation module 120, so as to optimize the operation mode of "rapidly and horizontally moving to a location and then performing horizontal or three-dimensional actions". For example, the multiaxial robot 100 of the embodiment can easily perform the action of obliquely placing the workpiece 20 on the horizontal table 2, which is what the conventional SCARA cannot achieve. Moreover, the multiaxial robot 100 of the embodiment can complete the whole action (i.e., moving to the destination and then performing the action of obliquely placing the workpiece 20) faster than the conventional six-axis mechanical arm.

In more detail, in some embodiments, as shown in FIG. 1B, the elevator member 130 includes a pivotal portion 131, an engaging portion 132, a ball screw 133, and a cover 134. The pivotal portion 131 is pivotally connected to the base 111. The engaging portion 132 is connected to the pivotal portion 131 and located with a recess of the pivotal portion 131. The ball screw 133 is rotatably disposed on the base 111. The cover 134 covers the engaging portion 132 within the recess of the pivotal portion 131. The first arm 112 includes an engaging portion 112a extending between a gap formed between the pivotal portion 131 and the cover 134 of the elevator member 130. The engaging portion 112a of the first arm 112 is slidably connected to the engaging portion 132 and meshed with the ball screw 133. As such, when the ball screw 133 of the elevator member 130 rotates, the first arm 112 is driven by the ball screw 133 (e.g., actuated by a motor) to slide upwards or downwards relative to the elevator member 130. In addition, the first arm 112 further includes a surrounding portion 112b surrounding the cover 134.

In some embodiments, the second plane (i.e., the plane in which the first wrist 121 rotates) is substantially perpendicular to the first plane (i.e., the plane in which the arms of the first rotation module 110 rotate), but the disclosure is not limited in this regard.

In some embodiments, the elevating direction A is substantially perpendicular to the first plane (i.e., the plane in which the arms of the first rotation module 110 rotate), but the disclosure is not limited in this regard.

In some embodiments, the second rotation module 120 adopted in the multiaxial robot 100 can only include the first wrist 121, and the end of the first wrist 121 distal to the arms is configured to grab or place the workpiece 20. Although the full degrees of freedom cannot be achieved, the action of obliquely placing the workpiece 20 can still be performed. Moreover, the structural configuration reduces one motor, so as to reduce the overall implementation costs.

In some embodiments, the number of the arms included the first rotation module 110 adopted in the multiaxial robot 100 can be larger than three, so as to increase the degrees of freedom to meet the actual demands.

Figure 3:
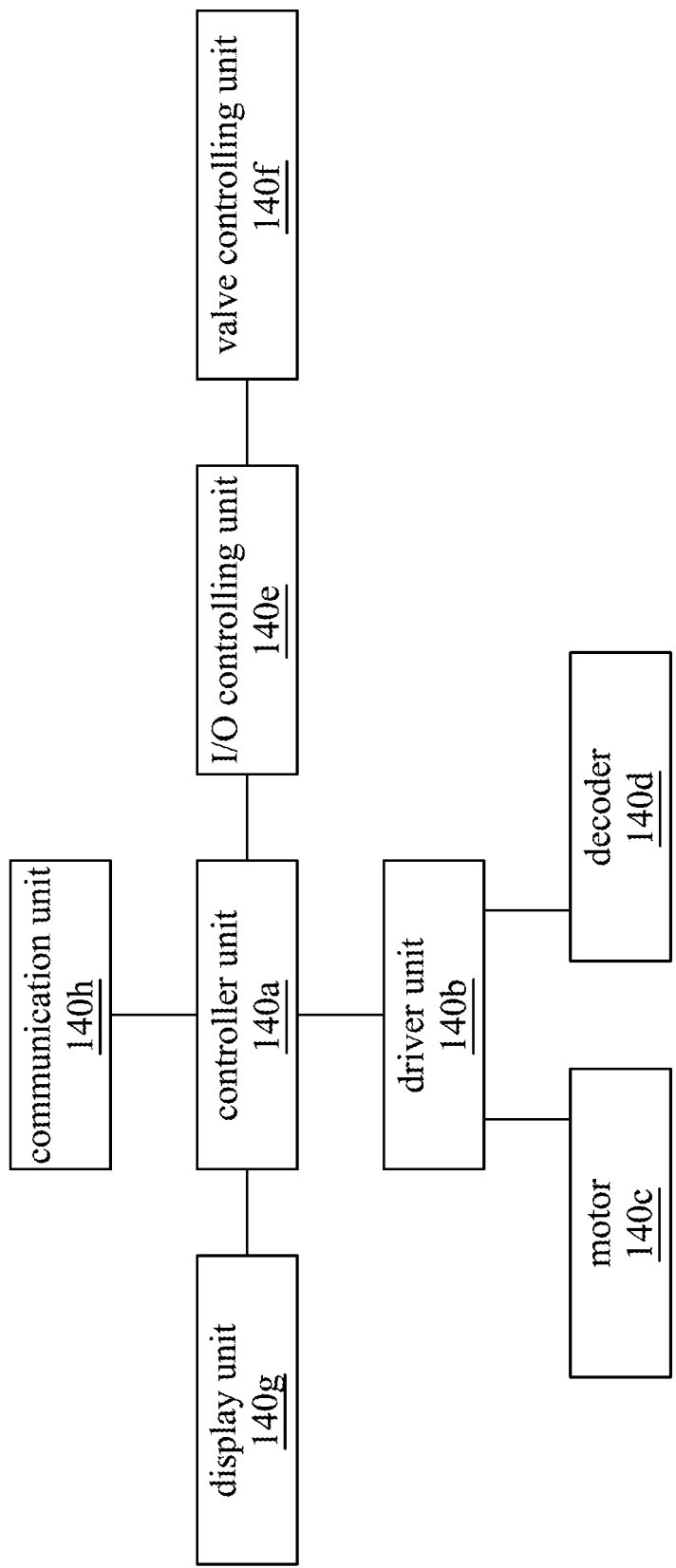
FIG. 3 is a block diagram of a multiaxial robot according to an embodiment of the disclosure.

Reference is made to FIG. 3. FIG. 3 is a block diagram of a multiaxial robot 100 according to an embodiment of the disclosure. As shown in FIG. 3, in the embodiment, the multiaxial robot 100 further includes a controller unit 140a, a driver unit 140b, a motor 140c, a decoder 140d, an I/O controlling unit 140e, a valve controlling unit 140f, a display unit 140g (with reference to FIG. 1A), and a communication unit 140h. In practical applications, each pivotal portion of the arms or the elevator member 130 is equipped with the motor 140c and the decoder 140d. As a result, each arm or each wrist can rotate or the elevator member 130 can elevate by using the motor 140c, and the value of the rotation angle of each arm or each wrist or the value of the rotation angle of the motor 130 of the elevator member 130 can be obtained by the decoder 140c. The driver unit 140b is configured to drive the motor 140c. The I/O controlling unit 140e (i.e., a keyboard) is configured for users to input instructions to control the multiaxial robot 100 to perform specific actions. The controller unit 140a is configured to control the driver unit 140b according to the inputted instructions and the data obtained by the decoder 140d. The display unit 140g is configured to display information relative to the multiaxial robot 100. The communication unit 140h is configured to communicate with other computers or controllers.

Figure 4A:
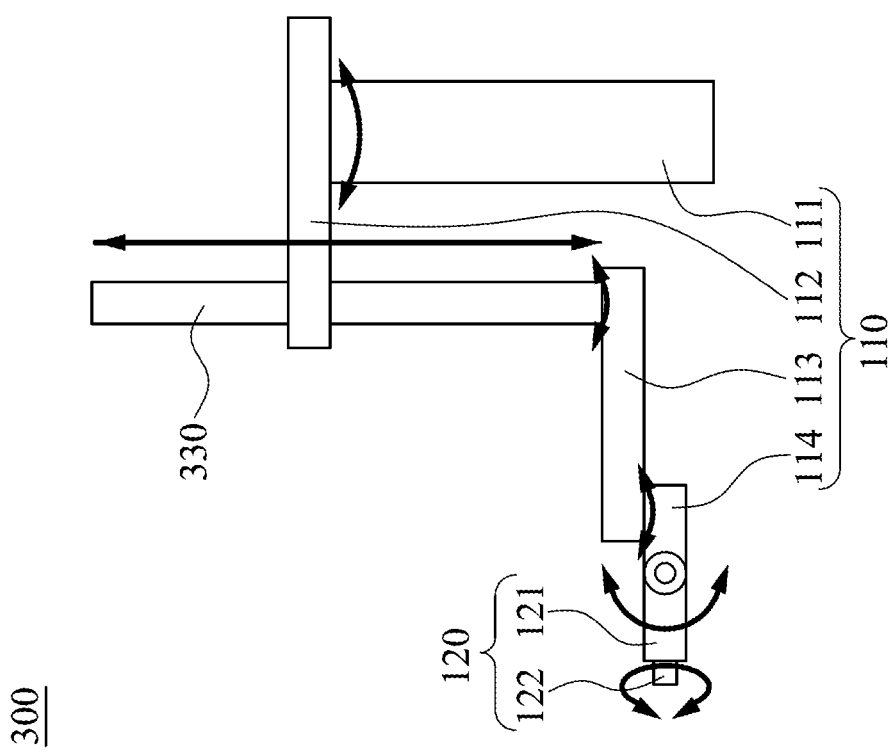
FIG. 4A is a schematic diagram of a multiaxial robot according to another embodiment of the disclosure.

Reference is made to FIG. 4A. FIG. 4A is a schematic diagram of a multiaxial robot 300 according to another embodiment of the disclosure. As shown in FIG. 4A, in the embodiment, the multiaxial robot 300 also includes the first rotation module 110, the second rotation module 120, and the elevator member 330. The first rotation module 110 also includes the first arm 112, the second arm 113, and the third arm 114. The second rotation module 120 also includes the first wrist 121 and the second wrist 122. It should be pointed out that the difference between the present embodiment and the embodiment in FIG. 1A is that the present embodiment provides an alternative to the connection order of the arms, the wrists, and the elevator member. Specifically, in the multiaxial robot 300 of the present embodiment, an end of the first arm 112 is pivotally connected to the base 111, and another end of the first arm 112 is slidably connected to the elevator member 330. An end of the second arm 113 is pivotally connected to the elevator member 330. An end of the third arm 114 is pivotally connected to another end of the second arm 113. The first wrist 121 is pivotally connected to another end of the third arm 114. The second wrist 122 is pivotally connected to the first wrist 121. With the structural configuration, the multiaxial robot 300 of the embodiment can also provide the flat and fast operating characteristics by the first rotation module 110 and perform the actions with flexible angles (up to six degrees of freedom) by the second rotation module 120, so as to optimize the operation mode of "rapidly and horizontally moving to a location and then performing horizontal or three-dimensional actions".

Figure 4B:
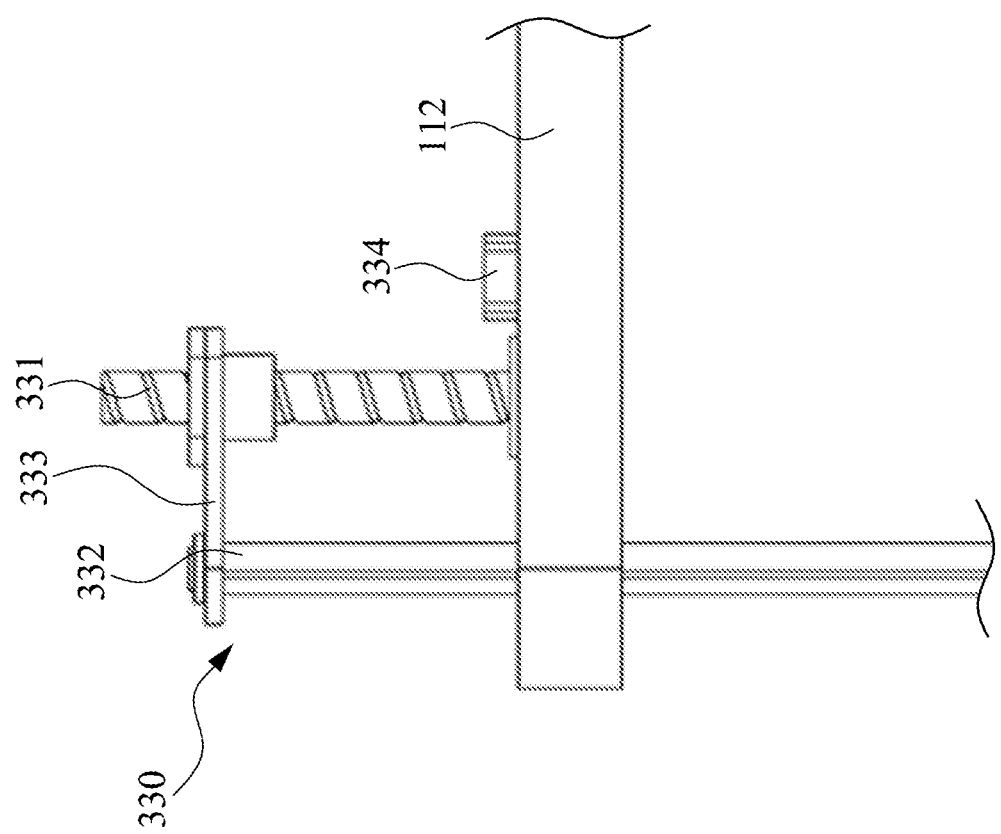
FIG. 4B is a partial side view of the multiaxial robot in FIG. 4A according to some embodiments of the disclosure.
Figure 4C:
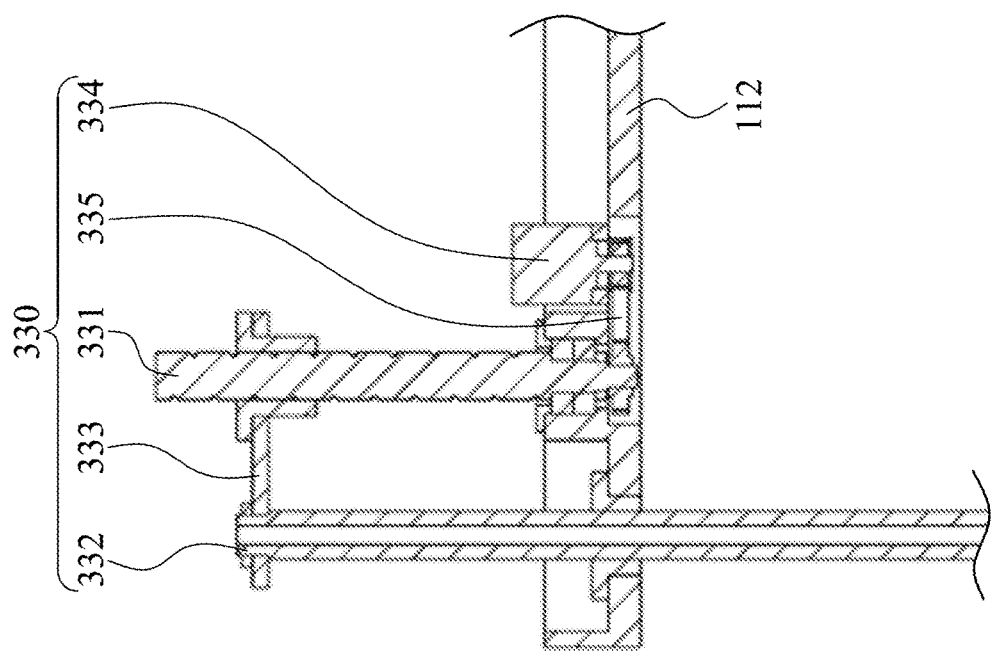
FIG. 4C is a partial cross-sectional view of the multiaxial robot in FIG. 4A according to some embodiments of the disclosure.

Reference is made to FIGS. 4B and 4C. FIG. 4B is a partial side view of the multiaxial robot 300 in FIG. 4A according to some embodiments of the disclosure. FIG. 4C is a partial cross-sectional view of the multiaxial robot 300 in FIG. 4A according to some embodiments of the disclosure. In some embodiments, as shown in FIGS. 4B and 4C, the elevator member 330 includes a ball screw 331, a guide rod 332, a bracket 333, a motor 334, and a belt 335. The ball screw 331 is rotatably connected to the first arm 112. The guide rod 332 passes through the first arm 112 and slidably engaged with the first arm 112. The bracket 333 is connected to an end of the guide rod 332 and meshed with the ball screw 331. The second arm 113 is pivotally connected to another end of the guide rod 332. The motor 334 is disposed on the first arm 112 and configured to drive the ball screw 331 to rotate relative to the first arm 112 through the belt 335, such that the guide rod 332 can slide upwards or downwards relative to the first arm 112.

Figure 5A:
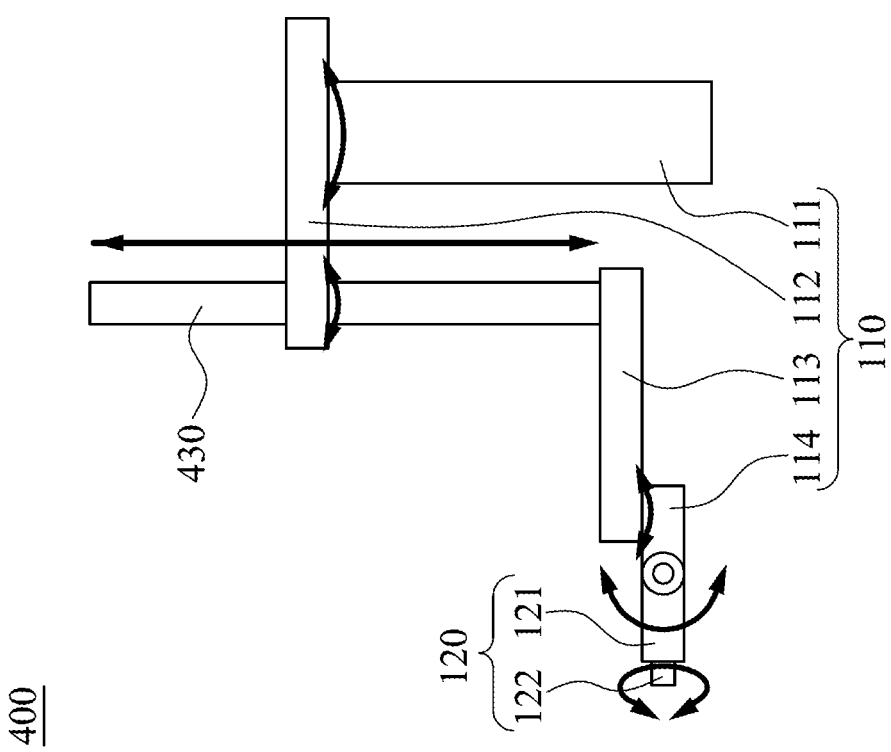
FIG. 5A is a schematic diagram of a multiaxial robot according to another embodiment of the disclosure.

Reference is made to FIG. 5A. FIG. 5A is a schematic diagram of a multiaxial robot 400 according to another embodiment of the disclosure. As shown in FIG. 5A, in the embodiment, the multiaxial robot 400 also includes the first rotation module 110, the second rotation module 120, and the elevator member 430. The first rotation module 110 also includes the first arm 112, the second arm 113, and the third arm 114. The second rotation module 120 also includes the first wrist 121 and the second wrist 122. It should be pointed out that the difference between the present embodiment and the embodiment in FIG. 1A is that the present embodiment provides an alternative to the connection order of the arms, the wrists, and the elevator member. Specifically, in the multiaxial robot 400 of the present embodiment, an end of the first arm 112 is pivotally connected to the base 111, and another end of the first arm 112 is slidably and pivotally connected to the elevator member 430. An end of the second arm 113 is connected to the elevator member 430. An end of the third arm 114 is pivotally connected to another end of the second arm 113. The first wrist 121 is pivotally connected to another end of the third arm 114. The second wrist 122 is pivotally connected to the first wrist 121. With the structural configuration, the multiaxial robot 400 of the embodiment can also provide the flat and fast operating characteristics by the first rotation module 110 and perform the actions with flexible angles (up to six degrees of freedom) by the second rotation module 120, so as to optimize the operation mode of "rapidly and horizontally moving to a location and then performing horizontal or three-dimensional actions".

Figure 5B:
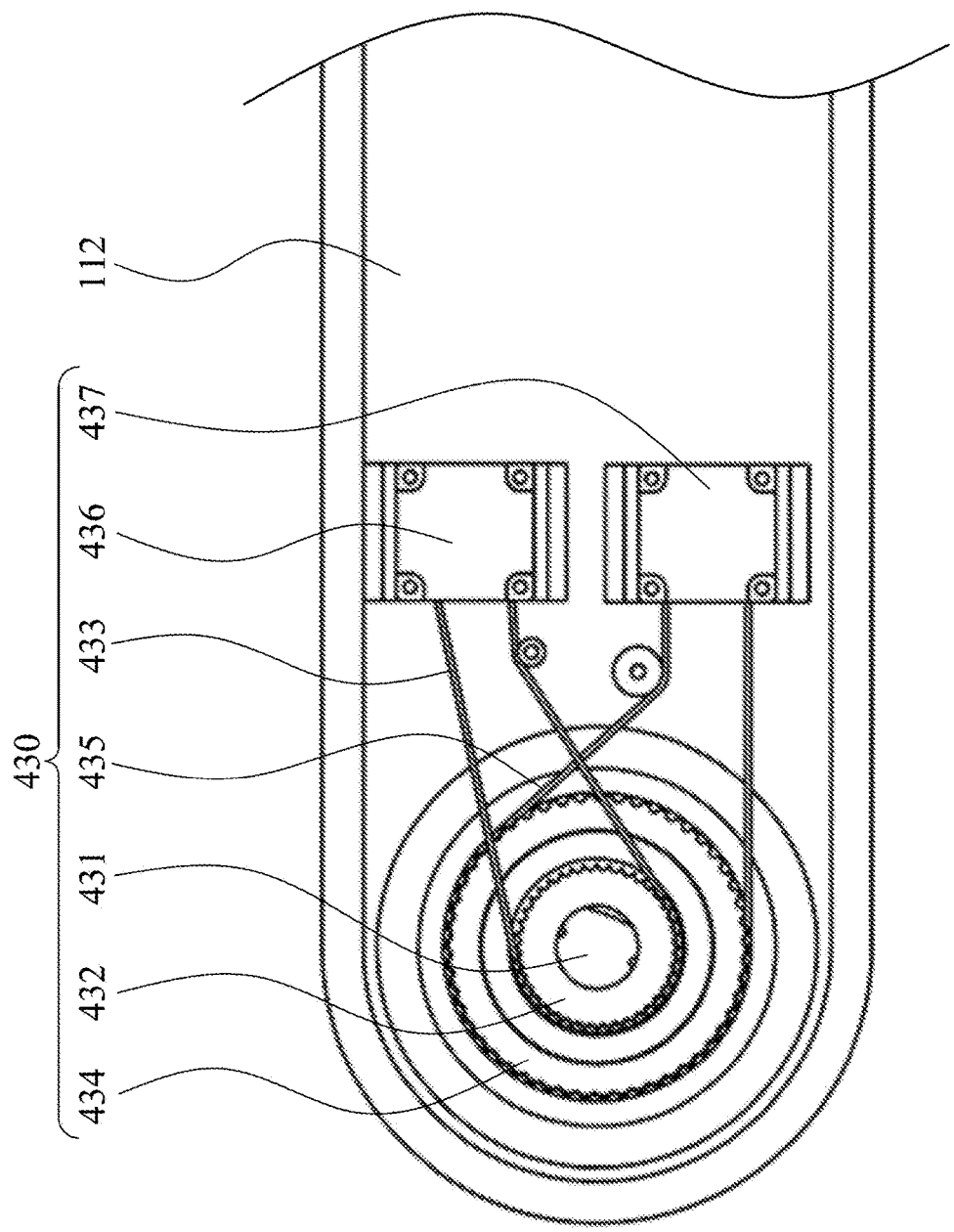
FIG. 5B is a partial top view of the multiaxial robot as shown in FIG. 5A according to some embodiments of the disclosure.
Figure 5D:
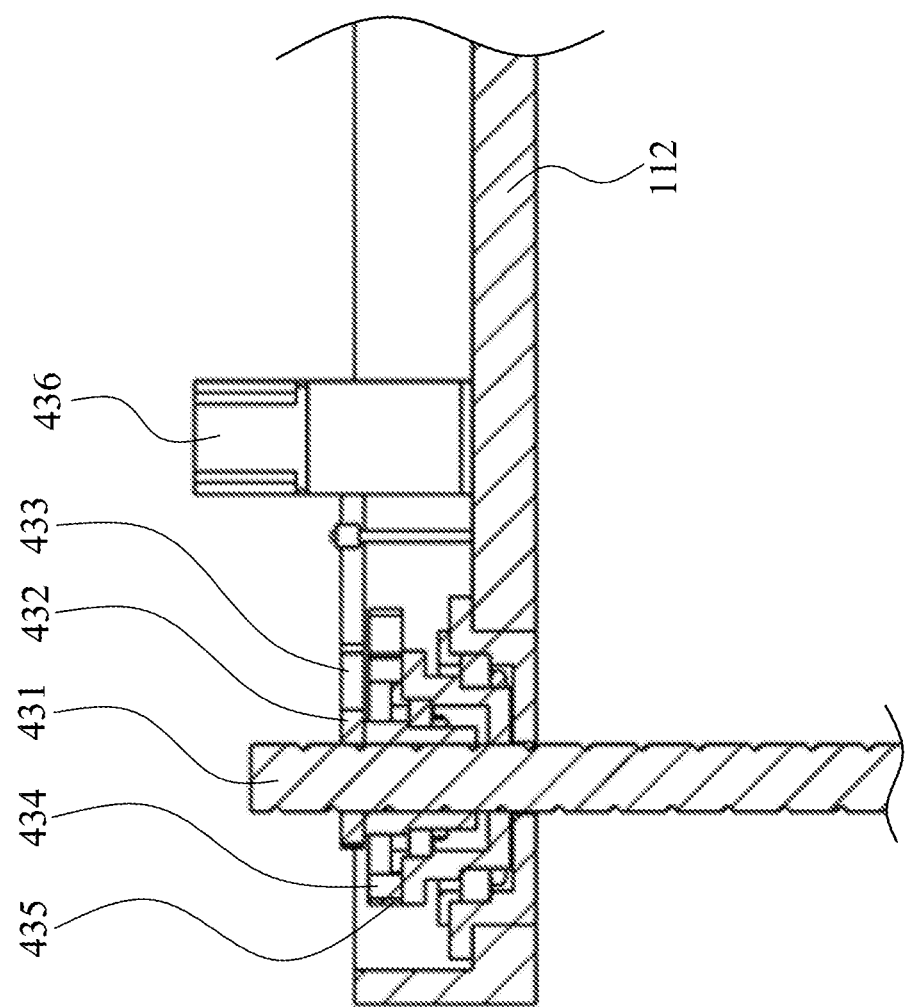
FIG. 5D is a partial cross-sectional view of the multiaxial robot in FIG. 5A according to some embodiments of the disclosure.

Reference is made to FIGS. 5B to 5D. FIG. 5B is a partial top view of the multiaxial robot 400 as shown in FIG. 5A according to some embodiments of the disclosure. FIG. 5C is a partial side view of the multiaxial robot 400 in FIG. 5A according to some embodiments of the disclosure. FIG. 5D is a partial cross-sectional view of the multiaxial robot 400 in FIG. 5A according to some embodiments of the disclosure. In some embodiments, as shown in FIGS. 5B to 5D, the elevator member 430 includes a ball screw spline shaft 431, a first belt pulley 432, a first belt 433, a second belt pulley 434, a second belt 435, a first motor 436, and a second motor 437. The ball screw spline shaft 431 rotatably passes through the first arm 112. The first belt pulley 432 is meshed with the ball screw spline shaft 431. The first motor 436 is disposed on the first arm 112 and configured to drive the first belt pulley 432 to rotate through the first belt 433. The second belt pulley 434 is sleeved onto and mounted to the ball screw spline shaft 431. The second motor 437 is disposed on the first arm 112 and configured to drive the second belt pulley 434 to rotate through the second belt 435. The second arm 113 is connected to an end of the ball screw spline shaft 431. When the first belt pulley 432 rotates relative to the ball screw spline shaft 431 and the second belt pulley 434 does not rotate relative to the ball screw spline shaft 431, the ball screw spline shaft 431 can slide upwards or downwards relative to the first arm 112 without rotating relative to the first arm 112. When the first belt pulley 432 does not rotate relative to the ball screw spline shaft 431 and the second belt pulley 434 rotates relative to the ball screw spline shaft 431, the ball screw spline shaft 431 can rotate relative to the first arm 112 without sliding upwards or downwards relative to the first arm 112. When the first belt pulley 432 and the second belt pulley 434 rotate relative to the ball screw spline shaft 431 at the same time, the ball screw spline shaft 431 can slide upwards or downwards and rotate relative to the first arm 112 at the same time.

Figure 6:
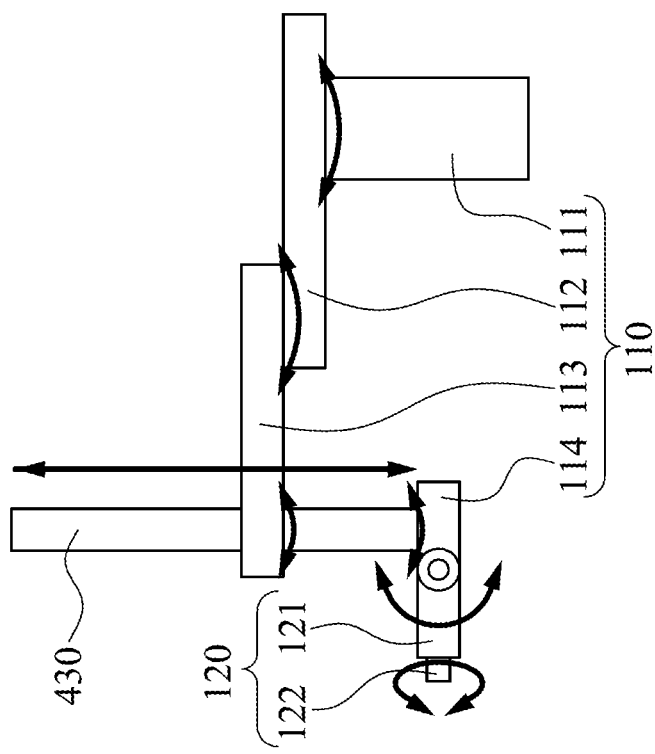
FIG. 6 is a schematic diagram of a multiaxial robot according to another embodiment of the disclosure.

Reference is made to FIG. 6. FIG. 6 is a schematic diagram of a multiaxial robot 500 according to another embodiment of the disclosure. As shown in FIG. 6, in the embodiment, the multiaxial robot 500 also includes the first rotation module 110, the second rotation module 120, and the elevator member 330. The first rotation module 110 also includes the first arm 112, the second arm 113, and the third arm 114. The second rotation module 120 also includes the first wrist 121 and the second wrist 122. It should be pointed out that the difference between the present embodiment and the embodiment in FIG. 1A is that the present embodiment provides an alternative to the connection order of the arms, the wrists, and the elevator member. Specifically, in the multiaxial robot 500 of the present embodiment, an end of the first arm 112 is pivotally connected to the base 111. An end of the second arm 113 is pivotally connected to another end of the first arm 112, and another end of the second arm 113 is slidably connected to the elevator member 330. An end of the third arm 114 is pivotally connected to the elevator member 330. The first wrist 121 is pivotally connected to another end of the third arm 114. The second wrist 122 is pivotally connected to the first wrist 121. With the structural configuration, the multiaxial robot 500 of the embodiment can also provide the flat and fast operating characteristics by the first rotation module 110 and perform the actions with flexible angles (up to six degrees of freedom) by the second rotation module 120, so as to optimize the operation mode of "rapidly and horizontally moving to a location and then performing horizontal or three-dimensional actions".

Figure 7:
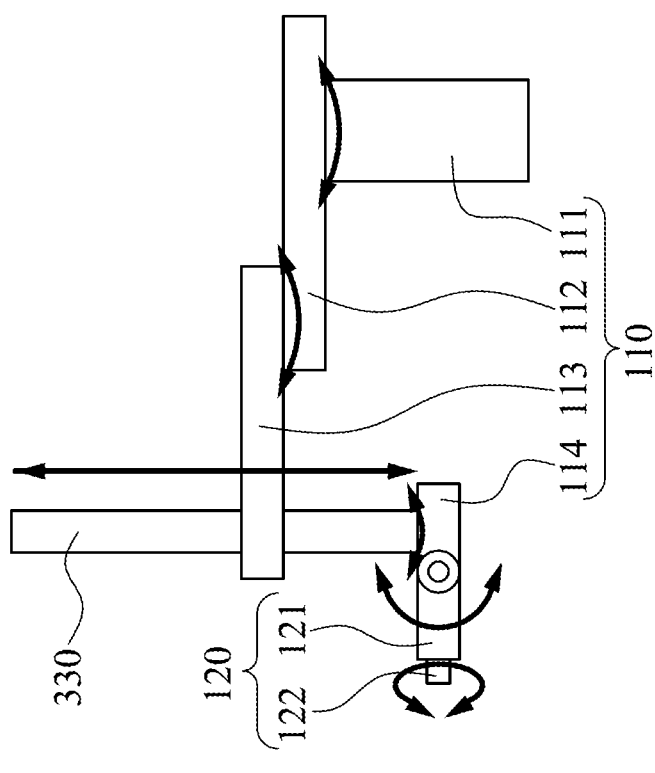
FIG. 7 is a schematic diagram of a multiaxial robot according to another embodiment of the disclosure.

Reference is made to FIG. 7. FIG. 7 is a schematic diagram of a multiaxial robot 600 according to another embodiment of the disclosure. As shown in FIG. 7, in the embodiment, the multiaxial robot 600 also includes the first rotation module 110, the second rotation module 120, and the elevator member 430. The first rotation module 110 also includes the first arm 112, the second arm 113, and the third arm 114. The second rotation module 120 also includes the first wrist 121 and the second wrist 122. It should be pointed out that the difference between the present embodiment and the embodiment in FIG. 1A is that the present embodiment provides an alternative to the connection order of the arms, the wrists, and the elevator member. Specifically, in the multiaxial robot 600 of the present embodiment, an end of the first arm 112 is pivotally connected to the base 111. An end of the second arm 113 is pivotally connected to another end of the first arm 112, and another end of the second arm 113 is slidably and pivotally connected to the elevator member 430. An end of the third arm 114 is pivotally connected to the elevator member 430. The first wrist 121 is pivotally connected to another end of the third arm 114. The second wrist 122 is pivotally connected to the first wrist 121. With the structural configuration, the multiaxial robot 600 of the embodiment can also provide the flat and fast operating characteristics by the first rotation module 110 and perform the actions with flexible angles (up to six degrees of freedom) by the second rotation module 120, so as to optimize the operation mode of "rapidly and horizontally moving to a location and then performing horizontal or three-dimensional actions".

Figure 8:
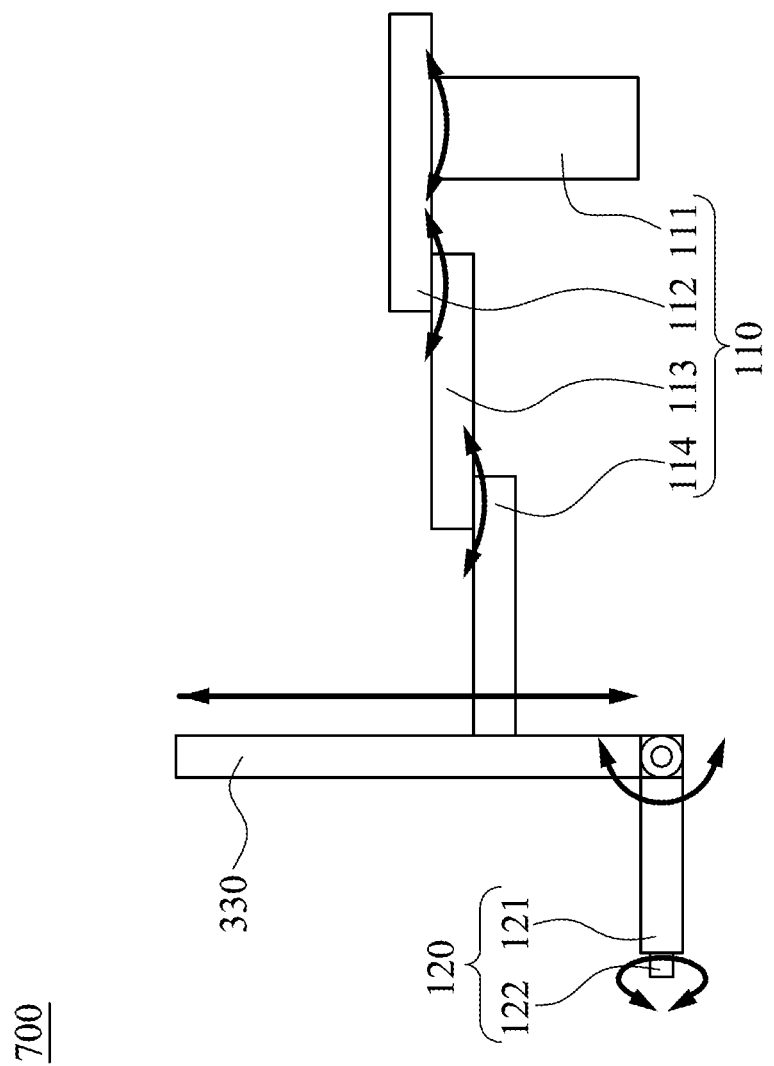
FIG. 8 is a schematic diagram of a multiaxial robot according to another embodiment of the disclosure.

Reference is made to FIG. 8. FIG. 8 is a schematic diagram of a multiaxial robot 700 according to another embodiment of the disclosure. As shown in FIG. 8, in the embodiment, the multiaxial robot 700 also includes the first rotation module 110, the second rotation module 120, and the elevator member 330. The first rotation module 110 also includes the first arm 112, the second arm 113, and the third arm 114. The second rotation module 120 also includes the first wrist 121 and the second wrist 122. It should be pointed out that the difference between the present embodiment and the embodiment in FIG. 1A is that the present embodiment provides an alternative to the connection order of the arms, the wrists, and the elevator member. Specifically, in the multiaxial robot 700 of the present embodiment, an end of the first arm 112 is pivotally connected to the base 111. An end of the second arm 113 is pivotally connected to another end of the first arm 112. An end of the third arm 114 is pivotally connected to another end of the second arm 113, and another end of the third arm 114 is slidably connected to the elevator member 330. The first wrist 121 is pivotally connected to the elevator member 330. The second wrist 122 is pivotally connected to the first wrist 121. With the structural configuration, the multiaxial robot 700 of the embodiment can also provide the flat and fast operating characteristics by the first rotation module 110 and perform the actions with flexible angles (up to six degrees of freedom) by the second rotation module 120, so as to optimize the operation mode of "rapidly and horizontally moving to a location and then performing horizontal or three-dimensional actions".

According to the foregoing recitations of the embodiments of the disclosure, it can be seen that the multiaxial robot of the disclosure modifies the structural configuration of the SCARA. Specifically, the structural configuration of the multiaxial robot of the disclosure not only retains the flat and fast operating characteristics of the SCARA, but also adds the capability of performing actions with flexible angles (up to five or six degrees of freedom) of the six-axis mechanical arm. It can be seen that the multiaxial robot of the disclosure can optimize the operation mode of "rapidly and horizontally moving to a location and then performing horizontal or three-dimensional actions", which is different from the operation mode for "3D continuous path" of the six-axis mechanical arm, so the multiaxial robot does not have the disadvantages of difficult reverse movement, having singularities, and etc. Moreover, the multiaxial robot of the disclosure can be designed to be higher to achieve a high-cylinder range, which is better than the optimization of the conventional six-axis mechanical arm for multi-layer test stations and can effectively reduce the footprint of the multiaxial robot.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A multiaxial robot, comprising:
a first rotation module comprising:
a base; and
a plurality of arms configured to rotate parallel to a first plane relative to the base;
a second rotation module comprising at least one wrist, the wrist being connected to the farthest arm arranged from the base in the first rotation module and configured to rotate parallel to a second plane relative to the first rotation module; and
an elevator member pivotally connected to the base and connected to an adjacent one of the arms, the elevator member being configured to elevate components of the multiaxial robot arranged after the elevator member relative to the base in an elevating direction, wherein the elevator member comprises a cover, and a surrounding portion of the adjacent one of the arms surrounds the cover,
wherein the surrounding portion of the adjacent one of the arms is slidably connected to a first engaging portion of the elevator member via a second engaging portion of the adjacent one of the arms;
wherein the first engaging portion of the elevator member is disposed externally relative to the surrounding portion of the adjacent one of the arms.

2. The multiaxial robot of claim 1, wherein the elevator member is pivotally connected to the base, and the arms comprises:
a first arm, an end of the first arm being slidably connected to the elevator member;
a second arm, an end of the second arm being pivotally connected to another end of the first arm; and
a third arm, an end of the third arm being pivotally connected to another end of the second arm, wherein the wrist is pivotally connected to another end of the third arm.

3. The multiaxial robot of claim 1, wherein the second plane is substantially perpendicular to the first plane.

4. The multiaxial robot of claim 1, wherein the elevating direction is substantially perpendicular to the first plane.

5. The multiaxial robot of claim 1, wherein the second rotation module comprises:
a first wrist connected to the farthest arm arranged from the base in the first rotation module and configured to rotate parallel to the second plane relative to the first rotation module; and
a second wrist pivotally connected to the first wrist and configured to rotate parallel to a third plane relative to the first wrist.

* * * * *